(12) United States Patent
Mehlberg

(10) Patent No.: US 7,914,610 B2
(45) Date of Patent: Mar. 29, 2011

(54) STRIPPING PROCESS

(75) Inventor: Robert L. Mehlberg, Wheaton, IL (US)

(73) Assignee: UOP LLC, Des Plaines, IL (US)

( * ) Notice: Subject to any disclaimer, the term of this patent is extended or adjusted under 35 U.S.C. 154(b) by 429 days.

(21) Appl. No.: 11/933,138

(22) Filed: Oct. 31, 2007

(65) Prior Publication Data
US 2009/0107336 A1    Apr. 30, 2009

(51) Int. Cl.
  B01D 45/12 (2006.01)
  C10G 11/00 (2006.01)
(52) U.S. Cl. ............ 95/271; 208/113; 208/168; 55/348; 55/462; 422/145
(58) Field of Classification Search ............ 55/307–308, 55/348–349, 462–464, 466–467; 208/113, 208/168; 422/144, 145, 147; 95/271
See application file for complete search history.

(56) References Cited

U.S. PATENT DOCUMENTS

| | | | |
|---|---|---|---|
| 2,440,620 A | 4/1948 | Taff | 23/288 |
| 2,612,438 A | 9/1952 | Murphree | 23/288 |
| 3,894,932 A | 7/1975 | Owen | 208/74 |
| 4,364,905 A | 12/1982 | Fahrig et al. | 422/144 |
| 4,414,100 A | 11/1983 | Krug et al. | 208/153 |
| 4,574,044 A * | 3/1986 | Krug | 208/120.01 |
| 5,584,985 A | 12/1996 | Lomas | 208/113 |
| 6,224,833 B1 | 5/2001 | Rall | 422/143 |
| 6,680,030 B2 | 1/2004 | Koebel et al. | 422/144 |
| 6,841,133 B2 | 1/2005 | Niewiedzial et al. | 422/147 |
| 7,179,427 B2 | 2/2007 | Marchant et al. | 422/144 |
| 2005/0205467 A1 | 9/2005 | Hedrick et al. | 208/150 |

* cited by examiner

Primary Examiner — Walter D Griffin
Assistant Examiner — Renee Robinson
(74) Attorney, Agent, or Firm — James C Paschall

(57) ABSTRACT

In an FCC process in which swirl arms are used to discharge gas and catalyst from a riser, a baffle is used to direct descending catalyst away from a wall of a disengaging vessel proximate a stripping section comprising elongated strips of metal.

11 Claims, 2 Drawing Sheets

STRIPPING PROCESS

BACKGROUND OF THE INVENTION

This invention relates to processes and apparatuses for the fluidized contacting of catalyst with hydrocarbons. More specifically, this invention relates to processes and apparatuses for stripping entrained or adsorbed hydrocarbons from catalyst particles.

DESCRIPTION OF THE PRIOR ART

Fluid catalytic cracking (FCC) is a process that contacts hydrocarbons in a reaction zone with a catalyst composed of finely divided particulate material. The hydrocarbon feed and fluidizing gases, such as steam, fluidize the catalyst and typically transports it in a riser as the catalyst promotes the cracking reaction. As the cracking reaction proceeds, substantial amounts of hydrocarbon, called coke, are deposited on the catalyst. A high temperature regeneration within a regeneration zone burns coke from the catalyst by contact with an oxygen-containing stream that again serves as a fluidization medium. Coke-containing catalyst, referred to herein as spent catalyst, is continually removed from the reaction zone and replaced by coke-free or reduced coke catalyst from the regeneration zone. Fluidization of the catalyst particles by various gaseous streams allows the transport of catalyst between the reaction zone and regeneration zone.

In the FCC process, gaseous fluids are separated from particulate catalyst solids as they are discharged from a reaction conduit. The most common method of separating particulate solids from a gas stream uses centripetal separation. Centripetal separators are well known and operate by imparting a tangential velocity to gases containing entrained solid particles that forces the heavier solids particles outwardly away from the lighter gases for upward withdrawal of gases and downward collection of solids.

Initial quick centripetal separation may be effected by tangentially discharging a mixture of product gases and spent catalyst particles from a riser into a containment vessel. The containment vessel has a relatively large diameter and generally provides a first separation of solids from gases. In these arrangements, the initial stage of separation is typically followed by a second more compete separation of solids from gases in cyclones. An example of this arrangement may be found in U.S. Pat. No. 5,584,985. An exit from a riser conduit comprises an arcuate, tubular swirl arm which imparts a swirling, helical motion to the product gases and particulate catalyst as they discharge from the riser conduit into a disengaging vessel. The swirling, helical motion of the materials in the separation vessel effects an initial separation of the particulate catalyst from the gases. A gas recovery conduit communicates the disengaging vessel with cyclones in a reactor vessel. The mixture of gases and entrained catalyst is drawn up the gas recovery conduit and fed into cyclones to effect further separation of the particulate catalyst from the gases. This arrangement is known as UOP's VSS$^{SM}$ system.

We have found that the swirling of the mixture of gases and entrained catalyst exiting the swirl arms of the riser continues into the gas recovery conduit to a significant degree. The swirling of the mixture continues into the duct that communicates the gas recovery conduit with the cyclones. U.S. Pat. No. 6,841,133 recognized that by orienting the angular direction of the swirl motion of the mixture leaving the swirl arms of the riser to be counter to the angular direction of the swirl motion in the cyclones, the mixture entering the cyclone is more likely to first encounter the outer wall which generates the swirling motion in the cyclone. Hence, greater separation efficiency was achieved.

A majority of the hydrocarbon vapors that contact the catalyst in the reaction zone are separated from the solid particles by the aforementioned centrifugal separation methods. However, the catalyst particles employed in an FCC process have a large surface area, which is due to a great multitude of pores located in the particles. As a result, the catalytic materials retain hydrocarbons within their pores, upon the external surface of the catalyst and in the spaces between individual catalyst particles as they enter the stripping zone. Although the quantity of hydrocarbons retained on each individual catalyst particle is very small, the large amount of catalyst and the high catalyst circulation rate which is typically used in a modern FCC process results in a significant quantity of hydrocarbons being withdrawn from the reaction zone with the catalyst.

Therefore, it is common practice to remove, or strip, hydrocarbons from spent catalyst prior to passing it into the regeneration zone. The most common method of stripping the catalyst passes a stripping gas, usually steam, through a flowing stream of catalyst, counter-current to its direction of flow. Such steam stripping operations, with varying degrees of efficiency, remove the hydrocarbon vapors which are entrained with the catalyst and adsorbed on the catalyst.

The efficiency of catalyst stripping is increased by using vertically spaced baffles to cascade the catalyst from side to side as it moves down a stripping apparatus and counter-currently contacts a stripping medium. Typical stripping vessels have a series of outer baffles in the form of frusto-conical sections that direct the catalyst inwardly onto a series of inner baffles. The inner baffles are centrally located conical or frusto-conical sections that divert the catalyst outwardly onto the outer baffles. The stripping medium enters from below the lower baffles and continues rising upwardly from the bottom of one baffle to the bottom of the next succeeding baffle. Examples of these stripping devices for FCC units are shown in U.S. Pat. Nos. 2,440,620; 2,612,438; 3,894,932; 4,414,100 and 4,364,905. More recent stripping configurations have used multiple strips of metal provided in a patterned relationship to facilitate counter-current contacting of catalyst particles and stripping gas. Examples include gratings and structural packing disclosed in U.S. Pat. Nos. 6,680,030; 6,224,833 and 7,179,427.

Better stripping of hydrocarbons from spent catalyst brings important economic benefits to the FCC process by reducing "delta coke". Delta coke is the weight percent coke on spent catalyst less the weight percent coke on regenerated catalyst. Reducing delta coke in the FCC process permits a lowering of the regenerator temperature. More of the resulting, relatively cooler regenerated catalyst is required to supply the fixed heat load in the reaction zone. Hence, the reaction zone may operate at a higher catalyst-to-feed or catalyst-to-oil (C/O) ratio. The higher C/O ratio increases conversion which increases the production of valuable products. Therefore, it is desirable to decrease delta coke by more efficient catalyst stripping.

BRIEF SUMMARY OF THE INVENTION

We have discovered that catalyst discharged from a swirl exit of a riser to separate the spent catalyst from product gases may continue to swirl and has a tendency to fall along the outside wall of a disengaging vessel. The catalyst descending along the outside wall can bypass much of the stripping internals that comprise elongated strips of metal of structural packing or gratings in the lower disengaging vessel. This phenomenon can particularly affect spent catalyst entering the disengaging vessel though passages from a vessel such as a reactor vessel. We have invented a process and apparatus for directing descending catalyst particles toward the center of the stripping section over a baffle to ensure that the exposure of catalyst to the stripping internals is maximized and bypassing is avoided.

Additional details and embodiments of the invention will become apparent from the following detailed description of the invention.

DESCRIPTION OF THE INVENTION

The present invention is most appropriately used in any apparatus or process for conducting FCC in which catalytic particles and gases must be separated. The typical feed to an FCC unit is a gas oil such as a light or vacuum gas oil. Other petroleum-derived feed streams to an FCC unit may comprise a diesel boiling range mixture of hydrocarbons or heavier hydrocarbons such as reduced crude oils. In an embodiment, the feed stream may consist of a mixture of hydrocarbons having initial boiling points, as determined by the appropriate ASTM test method, above about 230° C. (446° F.), often above about 290° C. (554° F.) and typically above about 315° C. (600° F.) and end points no more than about 566° C. (1050° F.). The reaction zone of an FCC process is maintained at high temperature conditions which may generally include a temperature above about 425° C. (797° F.). In an embodiment, the reaction zone is maintained at cracking conditions which include a temperature of from about 480° to about 590° C. (896° to 1094° F.) and a pressure of from about 69 to about 517 kPa (ga) (10 to 75 psig) but typically less than about 275 kPa (ga) (40 psig). The catalyst-to-oil ratio, based on the weight of catalyst and feed hydrocarbons entering the bottom of the riser, may range up to 20:1 but is typically between about 4:1 and about 10:1. Hydrogen is not normally added to the riser generating an absence of substantial added hydrogen in the reactor, although hydrogen addition is known in the art. On occasion, steam may be passed into the riser to effect catalyst fluidization and feed dispersion. The average residence time of catalyst in the riser may be less than about 5 seconds. The type of catalyst employed in the process may be chosen from a variety of commercially available catalysts. A catalyst comprising a zeolite base material is preferred, but the older style amorphous catalyst may be used if desired.

The catalyst regeneration zone is preferably operated at a pressure of from about 69 to about 552 kPa (ga) (10 to 80 psig). The spent catalyst being charged to the regeneration zone may contain from about 0.2 to about 15 wt-% coke. This coke is predominantly comprised of carbon and can contain from about 3 to about 12 wt-% hydrogen, as well as sulfur and other elements. The oxidation of coke will produce the common combustion products: water, carbon oxides, sulfur oxides and nitrous oxides. As known to those skilled in the art, the regeneration zone may take several configurations, with regeneration being performed in one or more stages.

Figure 1:
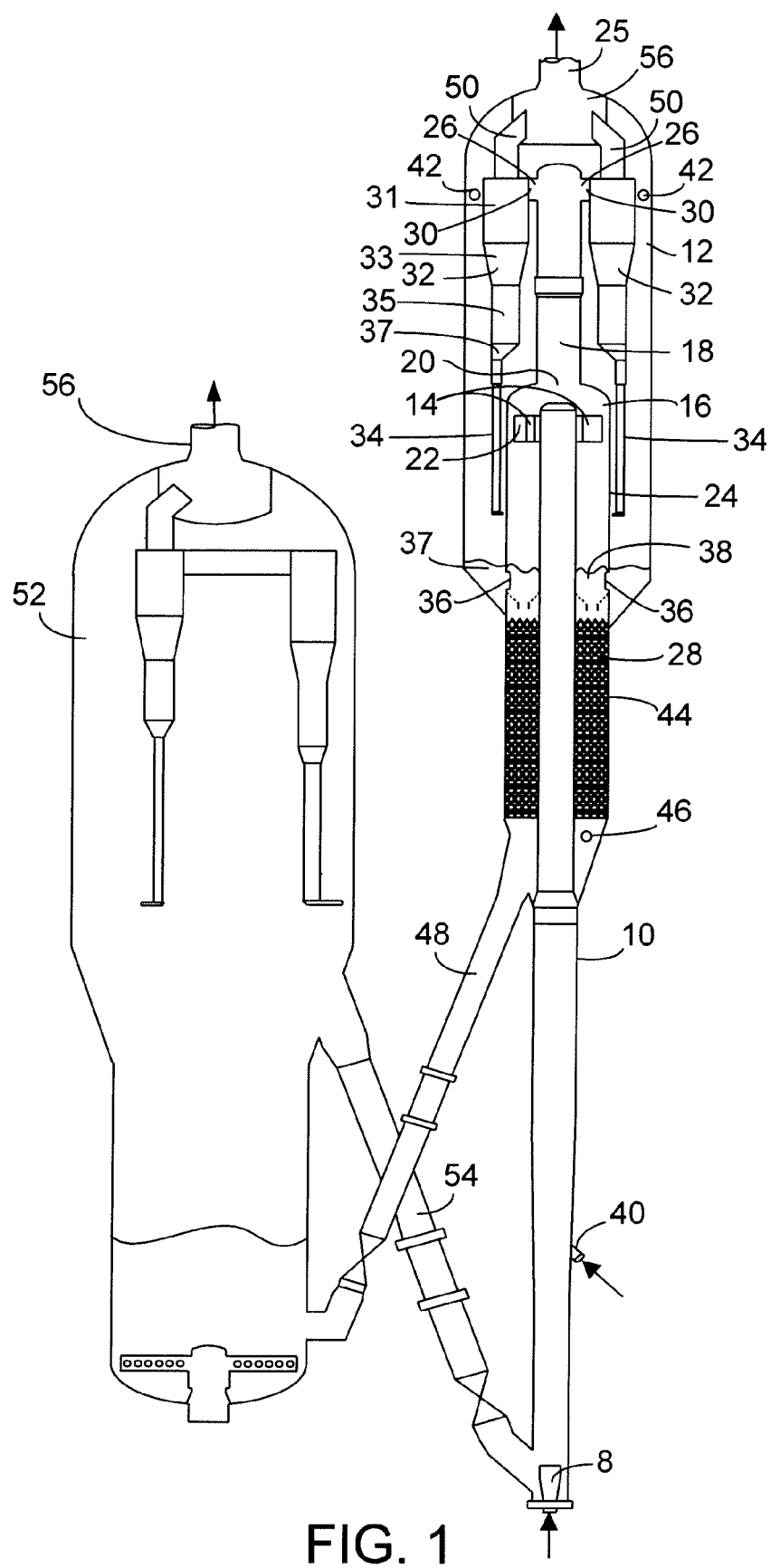
FIG. 1 is a schematic cross-sectional view of an FCC unit.

FIG. 1 is the schematic illustration of an FCC unit embodying the present invention. The FCC unit includes an elongated riser or reactor conduit 10. Hot catalyst is delivered to a lower section of the riser 10 from a conduit 54 at which a fluidizing gas from a distributor 8 pneumatically conveys the catalyst particles upwardly through the riser 10. As the mixture of catalyst and conveying gas continues up the riser 10, a nozzle 40 injects hydrocarbonaceous feed and perhaps steam into the catalyst. The contact with hot catalyst vaporizes the hydrocarbons and further conveys the mixture of gas and catalyst through the riser 10 while cracking the hydrocarbons to desirable lower boiling products.

The riser 10 extends upwardly into a reactor vessel 12 as in a typical FCC arrangement. The riser 10 preferably has a vertical orientation within the reactor vessel 12 and may extend upwardly through a bottom of the reactor vessel 12. The reactor vessel 12 includes a disengaging vessel 16 defined by an outer wall 24. The outer wall 24 of the disengaging vessel 16 has sections, some of which may be cylindrical. The riser 10 terminates in the disengaging vessel 16 at exits defined by the end of swirl arms 14. Each of the swirl arms 14 may be a curved tube that has an axis of curvature that may be parallel to the riser 10. Each swirl arm 14 has one end communicatively connected to the riser 10 and another open end comprising a discharge opening 22. The disengaging vessel 16 is in downstream communication with the discharge opening 22, so swirl arm 14 discharges a mixture of gaseous fluids comprising cracked products and solid catalyst particles through the discharge opening 22 into the disengaging vessel 16. Tangential discharge of gases and catalyst from the discharge opening 22 produces a swirling helical motion in an angular direction about the cylindrical interior of the disengaging vessel 16. Centripetal acceleration associated with the helical motion forces the heavier catalyst particles to the outer portions of the disengaging vessel 16 to effect disengagement of the catalyst particles from the gaseous product. Catalyst particles from the discharge openings 22 collect in the bottom of the disengaging vessel 16 to form a dense catalyst bed 38. The gases, having a lower density than the solid catalyst particles, more easily change direction and begin an upward spiral. The disengaging vessel 16 includes a gas recovery conduit 18 with an inlet 20 through which the spiraling gases ultimately travel. The gases that enter the gas recovery conduit 18 through the inlet 20 will usually contain a light loading of catalyst particles. The inlet 20 recovers gases from the discharge openings 22 as well as stripping gases from a stripping section 28 which may be located in the disengaging vessel 16 as is hereinafter described. The loading of catalyst particles in the gases entering the gas recovery conduit 18 are usually less than 16 kg/m3 (1 lb/ft3) and typically less than 3 kg/m3 (0.2 lb/ft3). The gas recovery conduit 18 of the disengaging vessel 16 includes an exit or outlet 26 contiguous with an inlet or entrance 30 to one or more cyclones 32 in the reactor vessel 12 that effect a further removal of catalyst particulate material from the gases exiting the gas recovery conduit 18 of the disengaging vessel 16. The reactor vessel surrounds and contains at least a portion of the disengaging chamber and is in downstream communication with the discharge openings 22 of the swirl arms 14. The disengaging vessel 16, the gas recovery conduit 18 thereof and the cyclones 32 may be directly connected, meaning that they are in fluid communication with each other and sealed against substantial leakage. Hence, substantially all of the gases and solids exiting the disengaging vessel 16 through gas recovery conduit 18 may enter the cyclones 32. It is envisioned that the reactor vessel 12 could be dispensed with, in which case one or more external cyclones 32 would be in downstream communication with said swirl outlet 22.

The cyclones 32 create a swirl motion therein to establish a vortex that further separates solids from gases. A product gas stream, relatively free of catalyst particles, exits the cyclones 32 through vapor outlet pipes 50 into a fluid-sealed plenum chamber 56. The product stream then exits the reactor vessel 12 through an outlet 25. Each cyclone 32 may include an upper cylindrical barrel section 31 contiguous with the entrance 30. The barrel section 31 may be connected by a first frustoconical section 33 to a hopper section 35. The hopper section 35 may be contiguous with a second frustoconical section 37 which may be contiguous with a dipleg 34. Catalyst solids recovered by the cyclones 32 exit the bottom of the cyclone through diplegs 34. The diplegs 34 may comprise conduits that may have one or more sections. Other cyclone configurations will be suitable. The diplegs 34 extend downwardly in the reactor vessel and may terminate at a flapper valve which prevents gas from entering the dipleg 34 but allows catalyst particles to exit into dense bed 37 at a bottom of the reactor vessel 12 surrounding the disengaging vessel 16.

Catalyst particles in the reactor vessel 12 are admitted by passages 36 into the disengaging vessel 16. The passages 36 may comprise windows between the reactor vessel 12 and the disengaging vessel 16 to allow catalyst to flow from the dense bed 37 into the dense bed 38 or a port or opening through which diplegs 34 or other conduit may transfer catalyst particles from cyclones 32 in the reactor vessel 12 into the disengaging vessel 16. The reactor vessel 12 and/or the cyclones therein are in upstream communication with the passages 36. Catalyst particles in the dense catalyst bed 38 enter the stripping section 28 located in the disengaging vessel 16. Catalyst particles pass downwardly through and/or over a plurality of elongated metal strips 44 arranged together in a three dimensional array in the stripping section 28. The strips may have straight portions set at angles to other strips or other portions of the same strip which may be straight. Layers or arrays of strips may be stacked in the stripping section. The metal strips 44 may define a structural packing or may define gratings with or without downcomers. Examples of suitable structural packing may be found in US 2005/0205467 and suitable gratings may be found in U.S. Pat. No. 6,680,030 for use in stripping vessels. A stripping fluid, typically steam, enters a lower portion of the stripping section 28 through at least one distributor 46. Counter-current contact of the catalyst with the stripping fluid over the metal strips 44 displaces product gases adsorbed on the catalyst as it continues downwardly through the stripping section 28. Stripped catalyst from the stripping section 28 may pass through a conduit 48 to a catalyst regenerator 52. In the regenerator, coke deposits are combusted from the surface of the catalyst by contact with an oxygen-containing gas at high temperature. Following regeneration, regenerated catalyst particles are delivered back to the bottom of the riser 10 through the conduit 54. Flue gas exits the regenerator 52 through nozzle 56.

We have found that the swirling motion induced by the product gases and catalyst particles issuing from the swirl arms 14 of the riser 10 may continue as the catalyst descends in the disengaging vessel. Catalyst particles due to swirling or other reasons tend to descend along the sides of the disengaging vessel. Consequently, the catalyst can descend in the stripping section down along the outer wall 24 of the disengaging vessel 16 a substantial depth before elongated metal strips in the stripping section 28 distribute the catalyst particles to the center of the stripping section. As a result the full effect of the stripping section is not realized for a substantial portion of the stripping section 28 during which avoiding intimate contact with the ascending stripping gas. The swirling and/or descending catalyst also tends to catch the catalyst particles passing through the passages 36 from the dense bed 37 in the reactor vessel 12 into the dense bed 38 in the disengaging vessel and push it toward the outer wall 24 as well, causing the same deficiency. This biasing of catalyst to the outer wall 24 also compounds deficiencies by biasing stripping gas inwardly, further avoiding intimate contacting of stripping gas with catalyst particles. Biasing catalyst also can further concentrate catalyst particles to erode equipment in the stripping section 28.

The present invention is further illustrated with reference to FIG. 2 which is an enlarged partial version of a top of the disengaging vessel 16 of FIG. 1. An outer baffle 60 is disposed in the disengaging vessel to direct descending catalyst particles away from the outer wall 24 of the disengaging vessel 16. The disengaging vessel is preferably a cylindrical vessel, so a plurality of the passages 36 may be circumferentially spaced around the wall of the disengaging vessel 16. The outer baffle 60 is disposed below the swirl outlet 22, preferably above the stripping section 28 and preferably may be disposed under each passage 36. Preferably, the outer baffle 60 may be a single annular baffle that encircles the disengaging vessel 16 disposed under each of the plurality of passages 36. Preferably, the outer baffle 60 is suitably secured to the outer wall 24. The outer baffle 60 may be disposed at an angle with respect to the vertical outer wall 24 of preferably 20 to 60 degrees with 45 degrees being suitable. The outer baffle 60 should have a horizontal projection of about one-third of the open dimension R of the stripping section 44. In a stripping section 44 in which the riser 10 extends through the stripping section 44 of the disengaging vessel 16 to form an annular stripping section 44, the open dimension R is the radial distance between a point on the inner surface of the outer wall 24 and the closest point on an outer surface of an outer wall 62 of the riser 10. An inner baffle 64 may also be provided to direct descending catalyst away from the outer wall 62 of the riser 10. The outer baffle 60 and the inner baffle 64 may be disposed at the same height in the disengaging vessel 16. The inner baffle 64 may be disposed at an angle with respect to the vertical outer wall 62 of preferably 20 to 60 degrees with 45 degrees being suitable. The inner baffle 64 may also have a horizontal projection that is one-third of the open dimension R, such that together outer baffle 60 and inner baffle 64 direct catalyst to the middle annular one-third of the stripping section 44. Other depths of projection of outer baffle 60 and inner baffle 64 may be suitable.

Baffles 60 and 64 are shown with perforations 66 therein to fluidize a top surface of the baffles. The perforations may also be equipped with tubes to define jets (not shown) about the perforations. Baffles 60 and 64 may also be equipped with skirts 68 to increase the pressure head below the baffles. Baffles 60 and 64 are also preferably submerged in the dense catalyst bed 38 and are preferably lined with refractory to avoid excessive erosion by gusting catalyst particles.

Baffles 60 and 64 direct descending, swirling catalyst from discharge opening 22 of swirl arms 14 toward the center of the stripping section 28. Consequently, catalyst particles begin their descent through the elongated metal strips 44 of the stripping section at the center. This assures that the catalyst particles contact the full range of elongated strips 44 which fosters intimate mixing with ascending stripping gas. It is believed that this apparatus and process will improve stripping efficiency of stripping vessels that use elongated strips for stripping internals.

Figure 2:
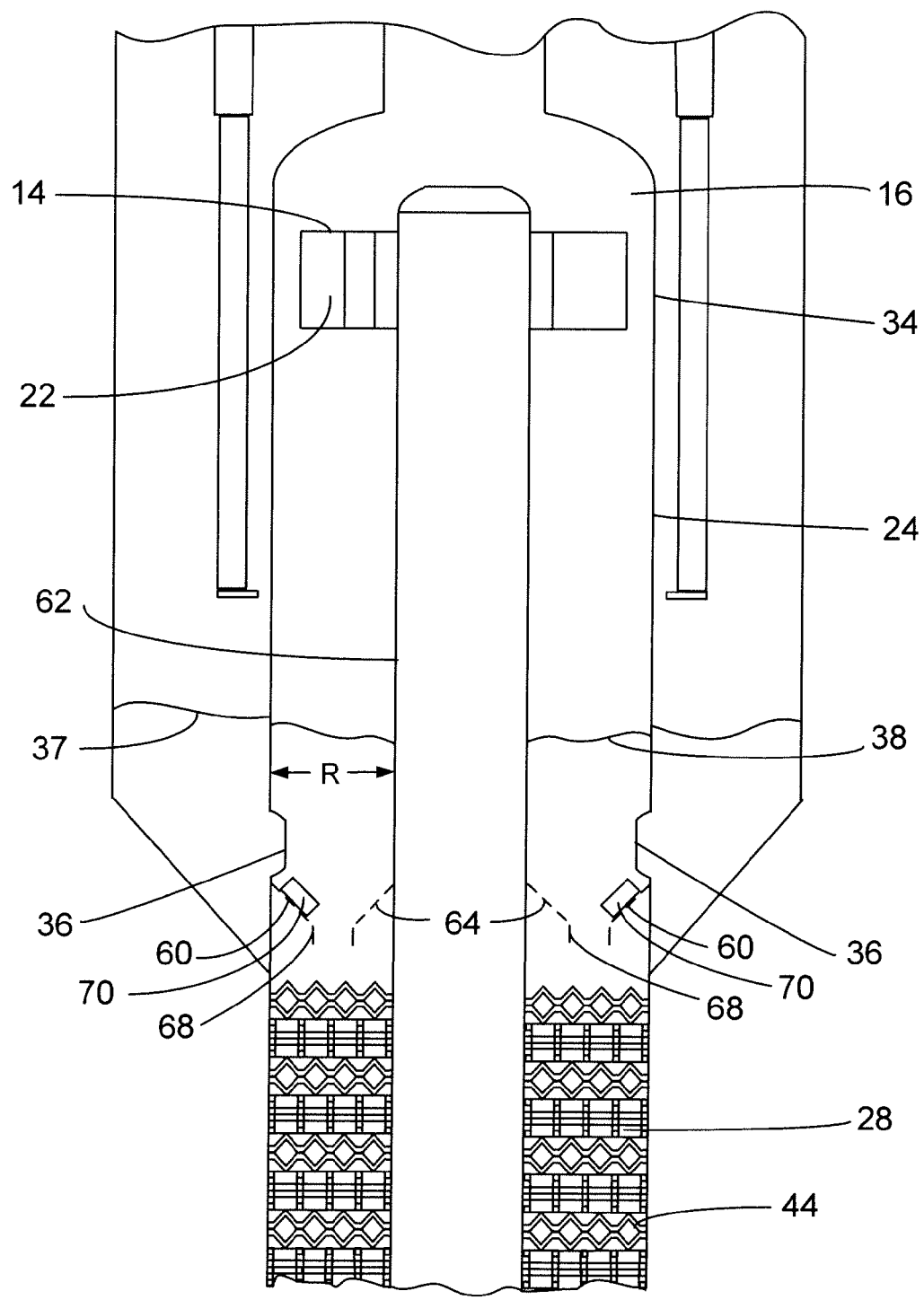
FIG. 2 is an enlarged partial view of a directing baffle of the present invention.

FIG. 2 also illustrates anti-swirl plates 70 disposed in the disengaging vessel 16 below the discharge openings 22 to dampen the angular motion of swirling catalyst particles and gases. One or more anti-swirl plates 70 can be laterally disposed and preferably radially disposed in the disengaging vessel so as to provide a broad face opposed to the angular momentum of swirling catalyst particles and gases. At least a portion of each anti-swirl plate 70 may be disposed above, partially above, even with, partially below or preferably below the passages 36 to prevent entering catalyst from being picked up in the swirling motion of descending catalyst particles and gases. The anti-swirl plates 70 may be secured to the outer wall 24 such as by welding. The anti-swirl plates are preferably secured to the respective outer baffle 60 which is secured to the outer wall 24 both such as by welding. The anti-swirl plates 70 are preferably on a top surface of the outer baffle 60, in which case each plate 70 may be inclined at the same angle as the baffle 60. The anti-swirl plates 70 are preferably submerged in the dense catalyst bed 38 and are preferably lined with refractory to mitigate erosion. If a plurality of passages 36 are disposed in the outer wall 24, one anti-swirl plate may be disposed adjacent and preferably subjacent to each passage 36 to prevent catalyst particles admitted through the passage 36 to be swept into the swirling, descending gas. One or more anti-swirl plates 70 may also be secured to the inner baffle 64 with or without the same positioning as an anti-swirl plate 70 on the outer baffle 60.

The invention claimed is:

1. A process for separating catalyst particles from a gaseous product stream comprising:
    contacting a hydrocarbon feed with catalyst particles in an elongated riser to produce a gaseous product;
    inducing the catalyst particles and gaseous products to swirl in an angular direction upon exiting said riser and entering a disengaging chamber to disengage catalyst particles from said gaseous product;
    stripping descending catalyst particles over elongated strips in a stripping section in said disengaging chamber;
    separating catalyst particles entrained with ascending product gases from said product gases;
    admitting separated catalyst particles into said disengaging chamber; and
    directing said descending catalyst particles over a baffle away from the outer wall of said disengaging chamber.

2. The process of claim 1, wherein said separated catalyst particles admitted through passages are directed over said baffle.

3. The process of claim 1 wherein said catalyst particles are directed over said baffle at an angle to said wall.

4. The process of claim 1 wherein said catalyst particles are separated from said product gases in a reactor vessel and are admitted into said disengaging chamber through passages.

5. The process of claim 1 wherein said descending catalyst particles are stripped by an ascending gas.

6. The process of claim 1, further including directing descending catalyst particles over a baffle away from a wall of said riser extending through said disengaging chamber.

7. The process of claim 1 wherein the descending catalyst particles are directed by baffles toward the center third of the stripper section.

8. The process of claim 1 wherein said baffle projects horizontally into the stripping section.

9. A process for separating catalyst particles from a gaseous product stream comprising:
    contacting a hydrocarbon feed with catalyst particles in an elongated riser to produce a gaseous product;
    inducing the catalyst particles and gaseous products to swirl in an angular direction upon exiting said riser and entering a disengaging chamber to disengage catalyst particles from said gaseous product;
    stripping descending catalyst particles over elongated strips in a stripping section in said disengaging chamber;
    separating catalyst particles entrained with ascending product gases in a reactor vessel;
    admitting separated catalyst particles from said reactor vessel through passages into said disengaging chamber;
    directing said catalyst particles admitted through said passages over a baffle away from the outer wall of said disengaging chamber; and
    directing descending catalyst particles over a baffle away from a wall of said riser extending through said disengaging chamber.

10. The process of claim 9 wherein said catalyst particles are directed over said baffles at an angle to said wall.

11. The process of claim 9 wherein said baffle projects horizontally into the stripping section.

* * * * *